US007891644B2

(12) United States Patent
Watanabe et al.

(10) Patent No.: US 7,891,644 B2
(45) Date of Patent: Feb. 22, 2011

(54) AIR SPRING (75) Inventors: Isao Watanabe, Yokohama (JP); Naoki Yamaguchi, Anjo (JP)

(73) Assignee: Bridgestone Corporation, Tokyo (JP)

( * ) Notice: Subject to any disclaimer, the term of this patent is extended or adjusted under 35 U.S.C. 154(b) by 1043 days.

(21) Appl. No.: 11/706,358

(22) Filed: Feb. 15, 2007

(65) Prior Publication Data
US 2007/0205546 A1  Sep. 6, 2007

(30) Foreign Application Priority Data
Feb. 15, 2006  (JP)  ............................. 2006-037978

(51) Int. Cl.
*F16F 9/05* (2006.01)
(52) U.S. Cl. .................................... 267/64.27; 267/122
(58) Field of Classification Search ............. 267/64.19, 267/64.21, 64.23, 64.24, 64.27, 122; 280/124.154, 280/124.155, 124.157, 124.158
See application file for complete search history.

(56) References Cited

U.S. PATENT DOCUMENTS 6,116,584 A * 9/2000 Romer ..................... 267/64.24
6,460,665 B1 * 10/2002 Gotz et al. ............... 267/64.27
2005/0253316 A1 * 11/2005 Harms et al. ............. 267/64.27

FOREIGN PATENT DOCUMENTS

| JP | 2000088029 A | * | 3/2000 |
| JP | 2004034871 A | * | 2/2004 |
| JP | 2004-156663 A | | 6/2004 |
| JP | 2005233424 A | * | 9/2005 |

OTHER PUBLICATIONS

European Search Report dated Jul. 14, 2009 (4 pages).

* cited by examiner

*Primary Examiner*—Thomas J Williams
(74) *Attorney, Agent, or Firm*—Sughrue Mion, PLLC (57) ABSTRACT

A air spring 10 is provided, where flex deformation of a shoulder portion in a dustcover due to the restorative force of a bellows portion during compression thereof is prevented, whereby deterioration of the life of the dustcover due to such deformation is prevented. With the air spring 10, a stopper 82 of a deformation-preventing cap 70 is arranged at the outer peripheral side of a shoulder portion 54 in a dustcover 50. At the time of compression deformation of a bellows portion 56, the stopper 82 comes into contact with the shoulder portion 54, and flex deformation of the shoulder portion 54 towards a linking tube 52 side is restricted. Due to this, the restorative force from the compression deformed bellows portion 56 via the shoulder portion 54 can be supported by the stopper 82 of the deformation-preventing cap 70. Even in a case where the rigidity of the shoulder portion 54 relative to the restorative force of the compression deformed bellows portion 56 cannot be sufficiently increased, the amount of flex deformation towards the linking tube side of the shoulder portion 54 that received the restorative force of the bellows portion 56 can be decreased.

14 Claims, 6 Drawing Sheets

AIR SPRING

CROSS-REFERENCE TO RELATED APPLICATION

This application claims priority under 35 USC 119 from Japanese Patent Application No. 2006-037978, the disclosure of which is incorporated by reference herein.

BACKGROUND OF THE INVENTION

1. Field of the Invention

The present invention relates to an air spring that uses pneumatic pressure and which causes the generation of elastic reactive force on an inputted load, and which supports the inputted load with this reactive force.

2. Description of the Related Art

A device such as that recited in the Official Gazette of JP-A No. 2004-156663 is known as an air spring used in applications such as vehicle suspensions. This air spring is provided with a shell (chamber component) linked to one of a support body or a movable body; a piston (piston component) linked to the other of the support body and the movable body; and a diaphragm that is formed into a cylindrical shape and whose middle portion is in a state where the inside and outside are reversed. The diaphragm has one end and another end that are respectively linked to the chamber component and the piston component, and a chamber is formed in the interior of the diaphragm.

The above-described air spring is provided with a dustcover arranged at the outer peripheral side of the diaphragm in order to protect the diaphragm from foreign matter such as rocks and sand, and from the atmosphere that includes reactive gases, such as oxygen. A linking tube is provided at the dustcover and fixed to the outer peripheral side of the chamber component at the upper end portion thereof. A shoulder portion that extends from the lower end portion of the linking tube towards the outer peripheral side is integrally provided with a tubular bellows portion that extends downward from the lower end portion of the shoulder portion and which can extend and contract along the direction of movement of the movable body. Here, the cross-sectional form of the shoulder portion is formed into a tapered shape where the inner and outer diameters widen downward towards the outer peripheral side.

The above-described air spring can be applied to vehicle suspensions. In this case, the chamber component is fixed to the vehicle side, which acts as the support body, and the piston component is linked and fixed to the suspension arm that is the movable body. The diaphragm is arranged between the vehicle body and the suspension arm in a state where it can extend and contract along the direction of pitching. Due to this, when the suspension arm pitches toward the vehicle body side (i.e., bound direction) due to load from the road surface side, the air inside the chamber in the diaphragm is compressed and the air pressure rises, and the load inputted from the road surface side through the suspension arm is supported by this air pressure. At this time, by adjusting the pressure of the air filled inside the chamber, it becomes possible to adjust the position of the suspension arm that is in a neutral position.

A dustcover such as that described above is generally formed integrally with blow-molding formation (blow-forming) using a material such as a resin or rubber and the like. Accordingly, the respective thicknesses of the linking portion, the shoulder portion, and the bellows portion cannot be greatly changed. Also, the linking portion, the shoulder portion, and the bellows portion cannot be formed from different types of materials where their respective specific intensities differ. For this reason, when forming the dustcover, it becomes difficult to make the rigidity of the shoulder portion sufficiently high when the flexibility of the bellows portion in the extending/contracting directions has been made high for the sake of ensuring good following qualities of the dustcover relative to the moving body (i.e., the suspension arm).

With the above-described air spring, when the rigidity of the shoulder portion in the dustcover is insufficient, the shoulder portion becomes unable to withstand the restorative force of the bellows portion at the time of suspension arm bounding, i.e., when the bellows portion is compression deformed. A phenomenon thus occurs where the shoulder portion deforms (i.e., flex deforms) so as to roll up towards the linking tube side. If this type of straining deformation occurs repeatedly at the shoulder portion, damage such as cracks and the like tend to occur in the shoulder portion in a relatively short period of time, and this can decrease the lifespan of the dustcover.

SUMMARY OF THE INVENTION

In light of the above-described matters, the present invention provides an air spring with which flex deformation of the shoulder portion due to restorative force of the bellows portion can be effectively controlled when the bellows portion in the dustcover is in compressed deformation. The present air spring can thus prevent deterioration of the lifespan of the dustcover due to such deformation. The air spring of the first embodiment comprises: a chamber component linked to one of a support body and a movable body; a piston component linked to the other of the support body and the movable body; a diaphragm formed in a substantially cylindrical shape and set in a state in which the inside and outside thereof at a middle portion are reversed, one end portion and the other end portion are linked, respectively, to the chamber component or the piston component, and a chamber is formed at the interior of the diaphragm; a dustcover that is arranged at an outer peripheral side of the diaphragm and that is provided with a linking tube fixed to an outer peripheral side of the chamber component at an upper end thereof, the dustcover being integrally provided with a shoulder portion that extends from a lower end portion of the linking tube to an outer peripheral side and a tubular bellows portion that extends downward from a lower end portion of the shoulder portion and is extendable and retractable along a direction of movement of the movable body; and a deformation-preventing component that is arranged at an outer peripheral side of the shoulder portion and that comes into contact with the shoulder portion when the bellows portion is in compression deformation, and restricts elastic deformation of the shoulder portion towards the linking tube side.

Due to the above-described embodiment, the deformation-preventing component is arranged at the outer peripheral side of the shoulder portion in the dustcover, and comes into contact with the shoulder portion when the bellows portion is in compression deformation. Thus, it restricts elastic deformation of the shoulder portion towards the linking tube side. Due to this, a part or all of the restorative force of the compression deformed bellows portion can be supported with the deformation-preventing component via the shoulder portion. Even in a case where the rigidity of the shoulder portion relative to the restorative force of the compression deformed bellows portion cannot be made sufficiently high, the amount of elastic deformation of the shoulder portion that received the restorative force of the bellows portion, towards the linking tube side, can be decreased.

As a result, the occurrence of early damage such as cracks and the like in the shoulder portion (due to elastic deformation of the shoulder portion towards the linking tube side) and deterioration in the lifespan of the dustcover can be prevented.

The above-described embodiment can be provided with a linking portion fixed to the chamber component at an upper end portion of the deformation-preventing component, and provided with a stopper that extends from a lower end portion of the linking portion towards the outer peripheral side of the shoulder portion, and which faces the shoulder portion.

The above-described embodiment can have the stopper provided so as to encircle the shoulder portion around the entire periphery from the outer peripheral side.

The above-described embodiment can have the stopper provided so as to face a portion along the peripheral direction at the shoulder portion from the outer peripheral side.

The above-described embodiments can be provided with a load disperser formed at the stopper that extends from the lower end portion thereof to the outer peripheral side in order to expand the area of contact between the stopper and the shoulder portion at the time of compression-deformation of the bellows portion.

The air spring of the second embodiment comprises: a chamber component linked to one of a support body and a movable body; a piston component linked to the other of the support body and the movable body; a diaphragm formed in a substantially cylindrical shape and set in a state in which the inside and outside thereof at a middle portion are reversed, one end portion and the other end portion are linked, respectively, to the chamber component or the piston component, and a chamber is formed at the interior of the diaphragm; a dustcover that is arranged at an outer peripheral side of the diaphragm and that is provided with a linking tube fixed to an outer peripheral side of the chamber component at an upper end portion thereof. The dustcover also being provided with a shoulder portion that extends from the lower end portion of the linking tube to an outer peripheral side and a tubular bellows portion that extends downward from a lower end portion of the shoulder portion and is extendable and retractable along a direction of movement of the movable body. The linking tube and the shoulder portion are integrally formed and the bellows portion is formed separately from the linking tube and the shoulder portion, and the dustcover is configured to link an upper end portion of the bellows portion to the lower end portion of the shoulder portion.

With the above-described embodiment, the dustcover is configured so that the linking tube and the shoulder portion in the dustcover are integrally formed, the bellows portion is formed separately from the linking tube and the shoulder portion, and the upper end portion of the bellows portion is linked to the lower end portion of the of the shoulder portion. Due to this, the shoulder portion and the bellows portion are formed from different types of materials where aspects such as their respective specific intensities differ, or the thickness can be arbitrarily set in accordance with the desired mechanical qualities such as rigidity and strength of the shoulder portion, without being affected by the thickness of the bellows portion Due to this, the rigidity of the shoulder portion relative to the restorative force of the compression deformed bellows portion can be sufficiently increased and the amount of elastic deformation of the shoulder portion that received the restorative force of the bellows portion towards the linking tube side can be decreased.

As a result, the rigidity of the shoulder portion relative to the restorative force of the compression deformed bellows portion can be sufficiently increased, so deformation of the shoulder portion towards the linking tube side due to the restorative force of the bellows portion can be prevented. Accordingly, the early occurrence of damage such as cracks and the like in the shoulder portion due to such deformation, and the deterioration of the lifespan of the dustcover, can be prevented.

The above-described embodiment can be configured so that the bellows portion is formed from an elastic material and the linking tube and the shoulder portion are formed from a material having a specific intensity greater than that of the bellows portion.

The above-described embodiment can be configured so that a tubular linking portion that is fit onto an outer peripheral side of the lower end portion of the shoulder portion is formed at the upper end portion of the bellows portion, and so that the air spring is further provided with a band component at the dustcover that is wound around from an outer peripheral portion of the linking portion so as to tighten and fix the linking portion to the lower end portion of the shoulder portion.

The above-described embodiment can be configured so that a load disperser is formed at the lower end portion of the shoulder portion so as to extend towards an inner peripheral side in order to expand the area of contact between the shoulder portion and the bellows portion.

The air spring of the third embodiment comprises: a chamber component linked to one of a support body and a movable body; a piston component linked to the other of the support body and the movable body; a diaphragm formed in a substantially cylindrical shape and set in a state in which the inside and outside thereof at a middle portion are reversed, one end portion and the other end portion are linked, respectively, to the chamber component or the piston component, and a chamber is formed at the interior of the diaphragm; a dustcover that is arranged at an outer peripheral side of the diaphragm and which is provided with a linking tube fixed to an outer peripheral side of the chamber component at an upper end thereof, is provided with a shoulder portion that extends towards an outer peripheral side from a lower end portion of the linking tube, and a circular tube that extends from a lower end side of the shoulder portion, and is further provided with a tubular bellows portion that extends downward from a lower end portion of the circular tube and can expand and contract along a direction of movement of the movable body. The present air spring is configured so that the linking tube, the shoulder portion, and the circular tube are integrally formed, the bellows portion is formed separately from the linking portion, the shoulder portion, and the circular tube, and the dustcover is configured to link an upper end portion of the bellows portion to the circular tube.

With the above-described embodiment, the dustcover is configured so that the linking tube, the shoulder portion, and the circular tube are integrally formed, and the bellows portion is formed separately from the linking tube, the shoulder portion, and the circular tube. The upper end portion of the bellows portion is linked to the lower end portion of the circular tube. Due to this, the linking tube, the shoulder portion, and the circular tube are formed from different types of materials where aspects such as their respective specific intensities differ from that of the bellows portion, or the thickness of the shoulder portion and the like can be arbitrarily set in accordance with the desired mechanical qualities such as rigidity and strength, without being affected by the thickness of the bellows portion. Due to this, the rigidity of the shoulder portion and the like relative to the restorative force of the compression deformed bellows portion can be sufficiently increased and the amount of elastic deformation of the shoulder portion and the like that received the restorative force of the bellows portion towards the linking tube side can be decreased.

As a result, the rigidity of components such as the shoulder portion relative to the restorative force of the compression deformed bellows portion can be sufficiently increased, so deformation of the shoulder portion and the like towards the linking tube side due to the restorative force of the bellows portion can be prevented. Accordingly, the early occurrence of damage such as cracks and the like in the shoulder portion due to such deformation, and the deterioration of the lifespan of the dustcover, can be prevented.

The above-described embodiment can be configured so that the bellows portion is formed from an elastic material and the linking tube, the shoulder portion, and the circular tube are formed from a material having a specific intensity greater than that of the bellows portion.

The above-described embodiment can be configured so that a tubular linking portion that is fit onto an outer peripheral side of the circular tube is formed at the upper end portion of the bellows portion, and the air spring is further provided with a band component, at the dustcover that is wound around from an outer peripheral side of the linking portion, and that tightens and fixes the linking portion to the circular tube.

The above-described embodiment can be configured so that a load disperser that extends towards the outer peripheral side is formed at the lower end portion of the circular tube.

The above-described embodiment can be configured so that an outer peripheral side of the load disperser is curved downward.

The above-described embodiment can be configured so that a fitting portion that fits onto the load disperser from the outer peripheral side is formed at the bellows portion.

Due to each of the above-described embodiments, the fitting portion of the bellows portion is fit onto the load disperser, and the linking portion of the bellows portion is tightened and fixed to the circular tube with the band, whereby, the linking strength between the bellows portion and the circular tube can be increased. As a result, when, for example, the vehicle is traveling on bad roads, dropping out of the linking portion from the circular tube can be prevented, even when excessive extending of the bellows portion occurs.

The above-described embodiment can be configured so that a slit is formed at the bellows portion from an upper end thereof in an axial direction at a position corresponding to the linking portion and the load disperser in an assembled state.

With the above-described embodiments, even in a case where the amount of restriction of the band was made sufficiently large, by narrowing the opening width of the slit in accordance with the amount of constriction of the band, the occurrence of wrinkles and slackening in the circular tube and the fitting portion at the dustcover is prevented, so when the linking portion is fixed to the circular tube using the band, the operational qualities thereof can be made favorable. Further, the linking strength of the bellows portion and the circular tube can be increased.

With the air spring according to the present invention as explained above, flex deformation of the shoulder portion due to the restorative force of the bellows portion at the time of compression thereof in the dustcover can be prevented, and deterioration of the lifespan of the dustcover due to such deformation can thus be prevented.

BRIEF DESCRIPTION OF THE DRAWINGS

Embodiments of the present invention will be described in detail based on the following figures, wherein.

DETAILED DESCRIPTION OF THE INVENTION

Hereafter, the air spring according to the exemplary embodiments of the present invention will be explained while referring to the drawings.

First Exemplary Embodiment

Figure 1:
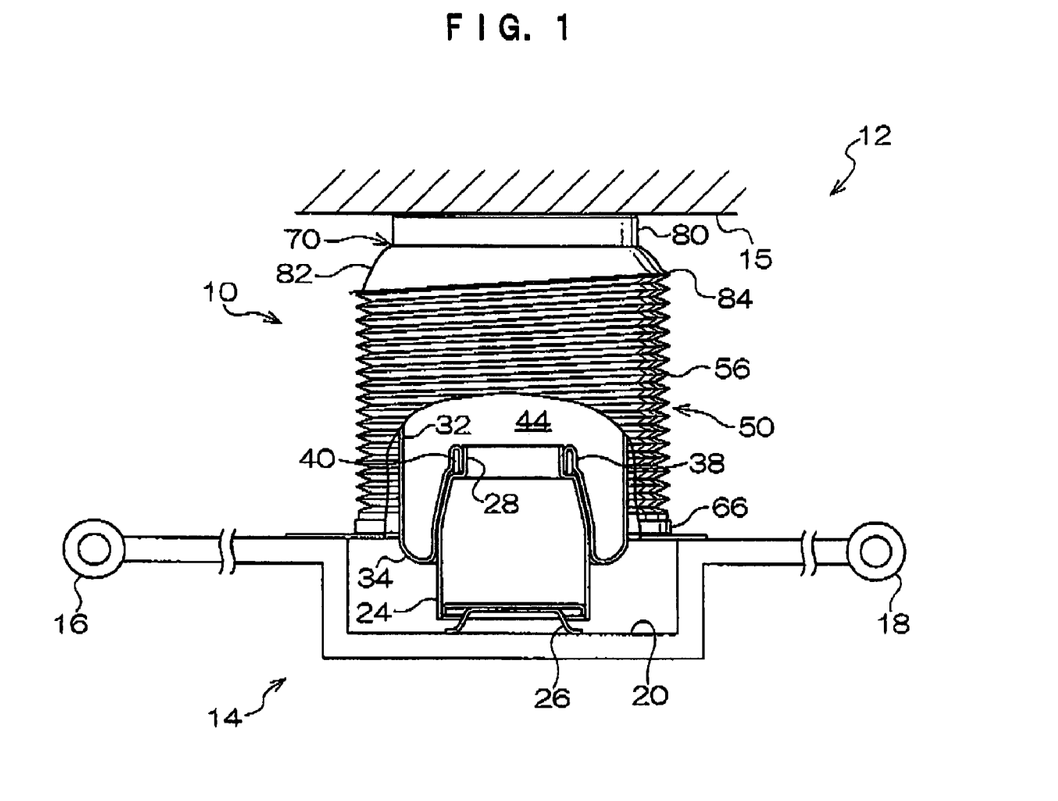
FIG. 1 is a side cross-sectional drawing showing the configuration of a suspension to which the air spring according to a first embodiment of the present invention has been applied, where the suspension arm is in a state where it is in a neutral position.
Figure 2:
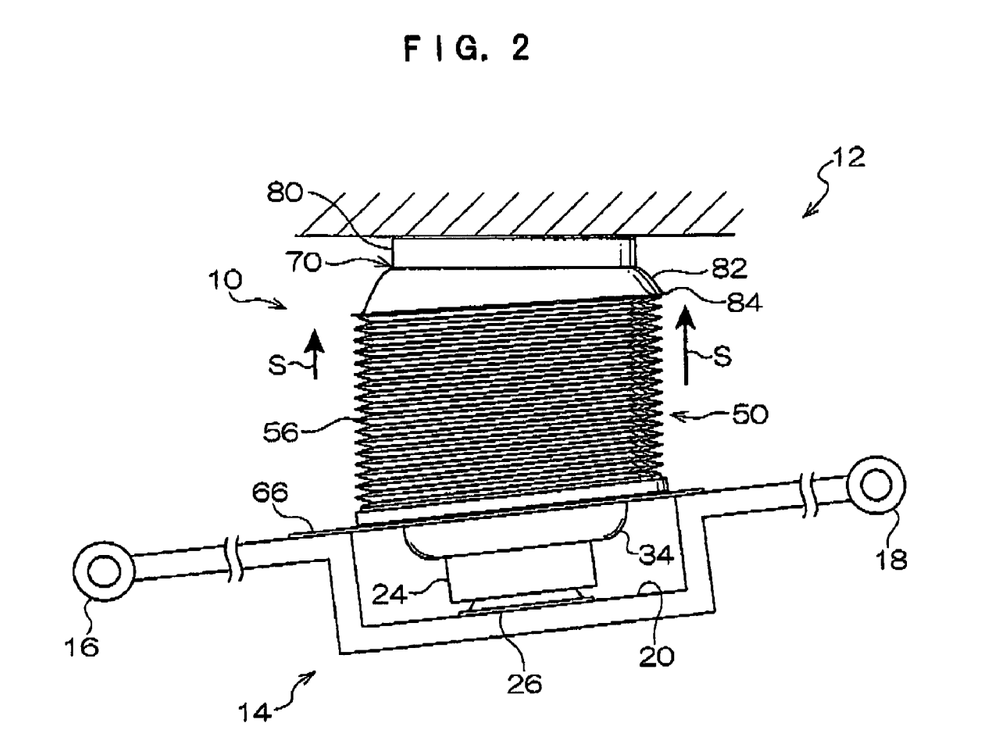
FIG. 2 is a side cross-sectional drawing showing the configuration of a suspension to which the air spring according to the first embodiment of the present invention has been applied, where the suspension arm is in a state where it has pitched upwards from the neutral position.
Figure 3:
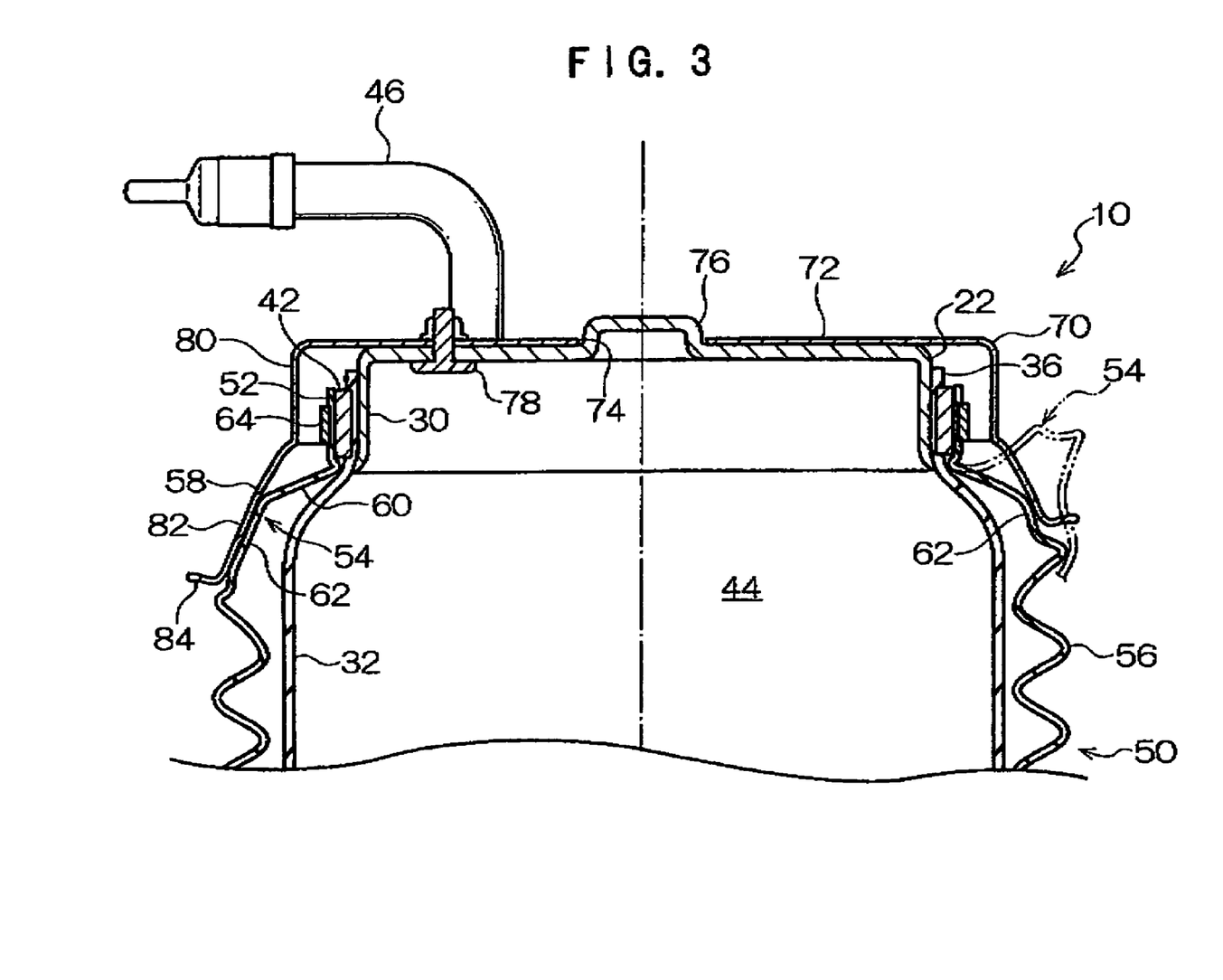
FIG. 3 is a side cross-sectional drawing showing the configuration in the vicinity of a deformation-preventing cap in the air spring shown in FIG. 1.

A typical suspension to which the air spring according to the first embodiment of the present invention has been applied is shown in FIGS. 1-3. As shown in FIG. 1, a suspension 12 is provided with an air spring 10, whose overall form is shaped in a drum form, and a suspension arm 14 formed in a beamlike shape. Cylindrical bushing holders 16, 18 are arranged on the suspension arm 14 respectively at the base end portion and the lead end portion in the longitudinal directions.

In the suspension arm 14, the bushing holder 16 of the base end side is movably linked at the vehicle body 15 side through a rubber bushing (not shown) and the bushing holder 18 is rotatably linked to a wheel hub (not shown) through a rubber bushing. Due to this, the suspension arm 14 is movably supported by the vehicle body 15 along the up and down directions with the bushing holder 16 at the base end side as the center. Also, a concave holder 20 is formed in the upper surface portion of the suspension arm 14 in the central part of the longitudinal direction thereof.

As shown in FIG. 1, a substantially cylindrical shaped piston component 24 with a bottom formed in the lower end side of the air spring 10 is provided and, as shown in FIG. 3, a chamber component 22 formed in a cylindrical shape with a top panel portion is arranged at the upper side of the piston component 24. As shown in FIG. 1, a cylindrical linked portion 28 is integrally formed with the piston component 24 in the upper end portion thereof, such that the inner and outer diameters of the upper end side relative to the lower end side of the linked portion 28 are smaller. A bracket 26 bent in a substantially trapezoidal shape is fixed to the undersurface side of the bottom panel of the piston component 24. The piston component 24 is fixed on the bottom surface in the holder 20 via the bracket 26. Also, as shown in FIG. 3, a cylindrical linked portion 30 is formed in a bent shape in the chamber component 22 so as to protrude downwards from the edges of the outer peripheral side of the top panel portion thereof.

As shown in FIGS. 1 and 3, the air spring 10 is provided with a thin cylindrically-shaped diaphragm 32 that is linked respectively to the linked portion 28 of the piston component 24 and the linked portion 30 of the chamber component 22. The diaphragm 32 is formed from a rubber membrane, the interior of which is provided with an embedded cord reinforcing layer (not shown). The diaphragm 32 is provided with a sagging portion 34 in the central portion along the up and down directions where the inner peripheral surface and the outer peripheral surface are formed into a reverse U-shape. Also, an upper side linking portion 36 that is inserted onto the outer periphery side of the linked portion 30 is provided in a cylindrical form at the upper end portion of the diaphragm 32, and a lower side linking portion 38 that is inserted onto the outer periphery side of the linked portion 28 is provided in a cylindrical form at the lower end portion thereof.

In the air spring 10, a bottom side fastening ring 40 is provided and attached around the outer periphery side of the lower side linking portion 38, and an upper side fastening ring 42 is provided and attached around the outer periphery side of the upper side linking portion 36. The bottom side fastening ring presses the lower side linking portion 38 towards the inner periphery side of the lower side linking portion 38, makes it crimp across the entire outer peripheral surface of the linked portion 28, and is linked and fixed so that the lower side linking portion 38 is in an airtight state with the linked portion 28. Further, the upper side fastening ring 42 presses the upper side linking portion 36 towards the inner periphery side, makes it crimp across the entire outer peripheral surface of the linked portion 30, and is linked and fixed so that the upper side linking portion 36 is in an airtight state with the linked portion 30. Due to this, a substantially columnar chamber 44 whose lower end portion and upper end portion are respectively blocked by the piston component 24 and the chamber component 22 is formed at the inner peripheral side of the diaphragm 32.

As shown in FIG. 1, the piston component 24 is fixed to a region that faces the holder 20 of the suspension arm 14 in the vehicle body 15. Due to this, the air spring 10 is arranged between the suspension arm 14 and the vehicle body 15. As shown in FIG. 3, one end of a pressure pipe 46 is connected to the upper panel portion of the chamber component 22. The other end of the pressure pipe 46 is connected to a compressed air-supplying source (not shown) such as an air pump or an accumulator mounted on the vehicle body 15 side, and this connects the compressed air-supplying source with the interior of the chamber 44. Through the pressure pipe 46, the pressurized air-supplying source supplies compressed air to the interior of the chamber 44, and the air pressure is in accordance with factors such as the state of vehicle travel and the movable load.

As shown in FIGS. 1 and 3, a dustcover 50 made from resin and formed in a substantially cylindrical shape at the outer peripheral side of the diaphragm 32 is provided at the air spring 10. A linking tube 52 that is fixed to the linked portion 30 of the chamber component 22 at the upper end portion is provided at the dustcover 50. Further, the dustcover 50 is integrally provided with a shoulder portion 54 that extends from the bottom end portion of the linking tube 52 towards the outer peripheral side, and with a cylindrical bellows portion 56 that extends from the bottom end portion of this shoulder portion 54 and which can extend and contract along the direction in which the suspension arm 14 pitches.

As shown in FIG. 3, a bent portion 58 bent into a V-shape at an intermediate portion in the vertical direction is formed at the shoulder portion 54, and a first sloped portion 60 and second sloped portion 62 are each formed around the entire periphery of the dustcover 50 at an upper side and lower side of the bent portion 58, respectively. The shoulder portion 54 overall is formed in a shape (a tapered shape) so as to extend downward at an incline from the bottom end portion of the linking tube 52 towards the outer peripheral side. With the shoulder portion 54, the angle of inclination of the first sloped portion 60 relative to the horizontal direction becomes smaller than the angle of inclination of the second sloped portion 62 relative to the horizontal direction, and the width of the first sloped portion 60 (i.e., the width of extension of the first sloped portion 60 from the bottom end side position of the linking tube 52 to the direction of the bellows portion 56) becomes substantially constant at a given position along the entire periphery. Also, the width of the second sloped portion 62 (i.e., the width of extension of the second sloped portion 62 from the bent portion 58 to the direction of the bellows portion 56) is widest at the position closest to the center of pitching of the suspension arm 14 (i.e. the bushing holder 16) and becomes gradually narrower the further away it gets from the bushing holder 16.

The linking tube 52 is formed in a cylindrical shape with a diameter smaller than that of the bellows portion 56 and is fit onto the outer peripheral side of the upper side fastening ring 42. The dustcover 50 is provided with a fastening band 64 wound around the outer peripheral side of the linking tube 52. This fastening band 64 makes the linking tube 52 crimp against and across the entire outer peripheral surface of the upper side fastening ring 42. Due to this, the linking tube 52 is fixed to the outer peripheral side of the linked portion 30 in the chamber component 22 via the upper side linking portion 36 and the upper side fastening ring 42.

Here, the linking tube 52, the shoulder portion 54, and the bellows portion 56 in the dustcover 50 are formed with blow-molding (blow-forming) with a material, e.g., polyolefin elastomer, which is a resin material relatively rich in flexibility. Note that with regard to the material for forming the dustcover 50, as long as the material is flexible and can be blow-formed, other materials besides a polyolefin elastomer can also be used, such as other resin materials and rubber compounds.

As shown in FIG. 1, the dustcover 50 is provided with a plate-shaped flange component 66 that is linked and fixed to the lower end portion of the bellows portion 56. The flange component 66 is formed into an annular shape that extends from the lower end portion of the bellows portion 56 across the entire periphery (towards the outer peripheral side) of the dustcover, and the undersurface side is made to crimp against the peripheral edge portions of the holder 20 in the suspension arm 14. The thickness of the flange component 66 is made thicker than that of the bellows portion 56 and is formed from a material with a higher rigidity than the resin material from which the bellows portion 56 is formed. Here, a resin having good resistance to weathering such as EPDM is applied to the material from which the flange component 66 is formed, however, this material is not limited to resin. For example, a metal or a compound material of resin and a reinforcing material (e.g., glass strengthening fibers) can also be used.

As shown in FIG. 1, many line segments are provided respectively in the vertical direction and each line segment extends around the periphery of the bellows portion 56. These line segments are arranged at a substantially constant pitch along the direction in which the suspension arm 14 pitches. With the bellows portion 56, the intermediate portion of the dustcover 50 is formed along the many line segments and alternately bends towards the inner peripheral side and the outer peripheral side. The intermediate portion of the dustcover 50 can easily extend and contract in the up and down directions by making the line segments act as hinges and changing the angles of the bent portions. With the air spring 10, when the suspension arm 14 is a little higher up than the lowermost position, the bellows portion 56 of the dustcover 50 enters a state of compression between this suspension arm 14 and vehicle body 15. Due to this, the dustcover 50 makes the undersurface side of the flange component 66 crimp towards the suspension arm 14 with the restorative force of the bellows portion 56.

Note that in order to make the trailing qualities of the dustcover 50 relative to the suspension arm 14 better, the flange component 66 of the dustcover 50 can be made so as to be fixed to the upper surface side of the suspension arm 14 using a fastening component such as a bolt or a nut. By configuring the device in this manner, the intrusion of foreign substances such as dust and the like into the dustcover 50 can be prevented with further effectiveness.

As shown in FIG; 3, the air spring 10 is provided with a deformation-preventing cap 70 arranged at the outer peripheral side of the shoulder portion 54 in the dustcover 50. The deformation-preventing cap 70 is formed into a substantially cylindrical shape where the upper surface side is closed off with the top panel 72 whose material is resin or metal. The deformation-preventing cap 70 is attached from above so as to be positioned to the outer peripheral side of the chamber component 22 and shoulder portion 54 and so that the top panel 72 is made to come into contact with the upper surface portion of the chamber component 22. A circular positioning hole 74 is provided in the central portion of the top panel 72 and a protruding positioning portion 76 formed in the central portion of the upper surface chamber component 22 is fit into this positioning hole 74. Due to this, the deformation-preventing cap 70 is coaxially positioned with the chamber component 22. Also, the deformation-preventing cap 70 is fixed to the chamber component 22 with a rivet 78 that passes through the top panel 72 and the chamber component 22.

A circular tube 80 that extends downward from the outer peripheral portion of the top panel 72 is formed in the deformation-preventing cap 70, and a stopper 82 that extends downward at an incline from the lower end portion of this circular tube 80 is integrally formed so as to covering the entire periphery of the dustcover. The angle of inclination of the stopper 82 to the horizontal direction is substantially equal to the angle of inclination of the second sloped portion 62 in the shoulder portion 54. The width of the stopper 82 of the deformation-preventing cap 70, as with the second sloped portion 62 of the shoulder portion 54, becomes widest at the position closest to the center of pitching of the suspension arm 14 (i.e., the bushing holder 16) and becomes gradually narrower the further it gets from the bushing holder 16. The deformation-preventing cap 70 makes the lower end side in the inner peripheral surface of the stopper 82 come into contact with the outer peripheral surface of the second sloped portion 62 in the shoulder portion 54. Also, a load disperser 84 that extends from the lower end portion of the stopper 82 towards the outer peripheral side is integrally formed at the entire periphery of the stopper 82.

As shown in FIG. 2, with the dustcover 50, when the suspension arm 14 pitches upward and the bellows portion 56 enters a state of compression, the restorative force S of the bellows portion 56 (see FIG. 2) acts on the shoulder portion 54. This restorative force S acts on the shoulder portion 54 as a load that makes the shoulder portion 54 formed into a tapered shape extending at an incline downwards deform (flex deform) into a reversed taper (see shoulder portion 54 as dashed dotted lines in FIG. 3). At this time, the stopper 82 of the dustcover 50 supports the restorative force from the bellows portion 56 through the shoulder portion 54 and restricts flex deformation of the outer peripheral side of the shoulder portion 54 upwards and hinders deformation of the shoulder portion 54 into a taper shape.

Next, the action and effects of the air spring 10 according to the embodiment configured as described above will be explained.

By arranging the air spring 10 according to the present embodiment between the vehicle body 15 and the suspension arm 14, the air spring 10 makes a suspension reactive force corresponding to the air pressure of the chamber 44 act on the suspension arm 14, and load inputted to the suspension arm 14 from the road surface side is supported by this suspension reactive force. At this time, when the suspension arm 14 pitches, the dustcover 50 makes the bellows portion 56 extend and contract in the up and down directions in response to the pitching of this suspension arm 14, and makes the flange component 66 move up and down so as to follow the suspension arm 14.

Also, as shown in FIG. 2, when the suspension arm 14 pitches, the dustcover 50 makes the amount of extension/contraction at one end side in the direction of diameter (in FIG. 2, the left side) at the bellows portion 56 near the center of pitching of the suspension arm 14 (bushing holder 16), and the amount of extension/contraction at the other end side in the direction of diameter (in FIG. 2, the right side) far from the center of pitching of the suspension arm 14 each differ, whereby the flange component 66 is inclined so as to follow the inclination of the suspension arm 14. Due to this, the flange component 66 is maintained in a state where it is crimped against the upper surface portion of the suspension arm 14 also when the suspension arm 14 pitches.

With the air spring 10 according to the present embodiment, the stopper 82 of the deformation-preventing cap 70 is arranged at the outer peripheral side of the shoulder portion 54 in the dustcover 50. The stopper 82 comes into contact with the shoulder portion 54 at the time of compression deformation of the bellows portion 56, so the air spring 10 restricts flex deformation of this shoulder portion 54 to the linking tube 52 side. That is, the restorative force of the bellows portion 56 compression deformed is supported by the stopper 82 through the shoulder portion 54. Accordingly, even in a case where the rigidity of the shoulder portion 54 relative to the restorative force of the compression deformed bellows portion 56 cannot be sufficiently increased, the amount of flex deformation to the linking tube side of the shoulder portion 54 that received the restorative force from the bellows portion 56 can be sufficiently decreased.

As a result, with the air spring 10 according to the present embodiment, even when the rigidity of the shoulder portion 54 relative to the restorative force of the of the compression deformed bellows portion 56 cannot be made sufficiently high, flex deformation of the shoulder portion 54 towards the linking tube 52 side due to the restorative force of the compression deformed bellows portion 56 can be effectively suppressed. Due to this, the early generation of damage such as cracks and the like in the shoulder portion 54 caused by the deformation and the deterioration of the life of the dustcover 50 can be prevented.

Also, with the air spring 10 according to the present embodiment, due to the fact that the load disperser 84 is formed at the lower end portion of the stopper 82, even when the outer peripheral side of the shoulder portion 54 and the upper end portion of the bellows portion 56 crimp in the vicinity of the lower end portion of the stopper 82 with high load due to the restorative force of the bellows portion 56, the load disperser 84 can be crimped in a state of contact with the surfaces of the outer peripheral side of the shoulder portion 54 and the upper end portion of the bellows portion 56. Due to this, the area of the crimping portion can be enlarged and the load can be dispersed so the stress (greatest stress) that is generated when the shoulder portion 54 and bellows portion 56 crimp with the stopper 82 can be made to decrease, and the occurrence of damage such as cracks in the shoulder portion 54 and bellows portion 56 can be effectively prevented.

Also, with the air spring 10 according to the present embodiment, when the suspension arm 14 has pitched upwards, the amount of compression deformation at the other end side in a radial direction at the bellows portion 56 near to the center of pitching of the suspension arm 14 (bushing holder 16) becomes greater than the amount of compression deformation at the one side in a radial direction. Due to this, when the compression deformed bellows portion 56 makes load (restorative force S) act on the shoulder portion 54 formed into a tapered shape so as to make it deform (counterturn) into a reverse-tapered shape, the size of the restorative force S (see FIG. 2) becomes greatest at the other end portion in the radial direction of the bellows portion 56 and smallest at the one end portion in the radial direction. Due to this, if the air spring 10 does not have the deformation-preventing cap 70, when the bellows portion 56 compression deforms, reverse taper-formed deformation (flex deformation) occurs only in the vicinity of the other end portion in the radial direction at the shoulder portion 54 due to the restorative force from the bellows portion 56, as shown with the dashed dotted lines in FIG. 3. There are also cases where flex deformation does not occur in the vicinity of the one end in the radial direction at the shoulder portion 54.

Note that it is not absolutely necessary for the stopper 82 of the deformation-preventing cap 70 to be arranged across the entire periphery at the outer peripheral side of the shoulder portion 54. The device can be configured so that the stopper portion is partially arranged only at the outer peripheral side in the vicinity of the other end portion in the diameter direction at the shoulder portion 54. In this case as well, where the stopper portion has been provided in this manner to face a portion along the peripheral direction of the shoulder portion 54, a load-dispersing portion is formed that extends at the lower end portion of this stopper towards the outer peripheral side. Due to this, the occurrence of damage such as cracks in the shoulder portion 54 and bellows portion 56 due to the stress generated by the shoulder portion 54 and bellows portion 56 crimping against the stopper 82 can be effectively prevented.

Second Exemplary Embodiment

Figure 4:
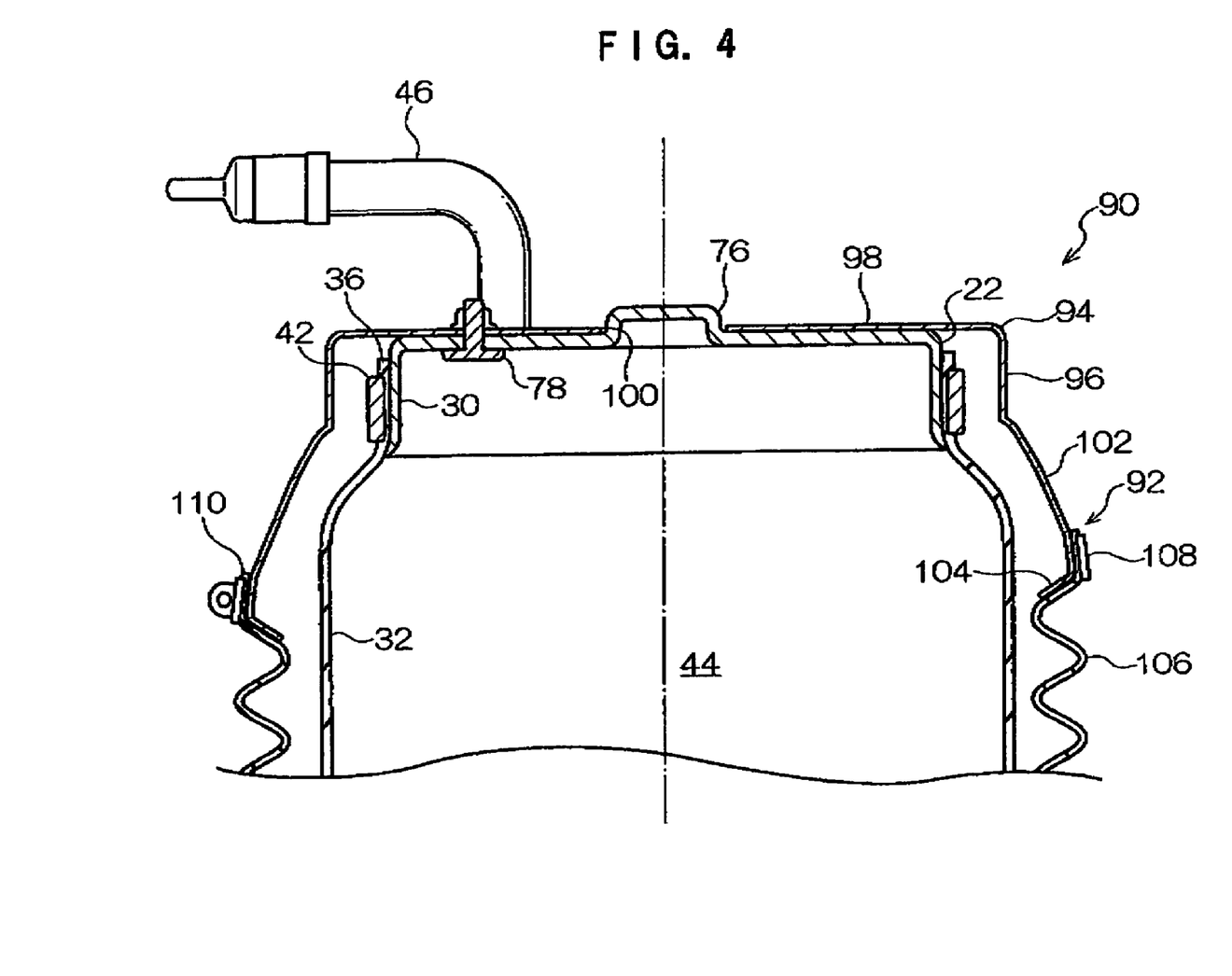
FIG. 4 is a side cross-sectional drawing showing the configuration of an air spring according to a second embodiment of the present invention.

A dustcover in an air spring 90 according to a second embodiment of the present invention is shown in FIG. 4. With the exception of the portion involving a dustcover 92, the air spring 90 according to the second embodiment is essentially the same as the air spring 10 according to the first embodiment. Accordingly, explanations regarding the air spring 90 according to the present embodiment with regard to portions besides the dustcover 92 will be provided with the same symbol number and explanations thereon will be omitted.

A dustcover 92 formed into a substantially cylindrical shape is provided at the air spring 90 at the outer peripheral side of the diaphragm 32. The dustcover 92 is provided at the upper end portion with a hanger component 94 formed into a substantially capped shape. A linking tube 96 is formed at the upper end side of the hanger component 94 in a substantially cylindrical shape and the top surface side of the linking tube 96 has a top panel 98 that seals the linking tube 96. The linking tube 96 is attached from above so as to be positioned at the outer peripheral side of the chamber component 22. The top panel 98 is made to come into contact with the top surface portion of the chamber component 22.

A circular positioning hole 100 is provided in the central portion of the top panel 98 of the linking tube 96 and a protrusion-shaped positioning portion 76 formed on the surface of the chamber component 22 in the central portion is fit into this positioning hole 100. Due to this, the linking tube 96 is coaxially positioned with the chamber component 22. The linking tube 96 is fixed to the chamber component 22 with the rivet 78 that passes through the top panel 98 and the top panel of the chamber component 22.

A shoulder portion 102 that extends downward at an incline from the lower end portion of the linking tube 96 towards the outer peripheral side is integrally formed around the entire periphery of the hanger component 94. The width of the shoulder portion 102 (i.e., the width of extension of the shoulder portion 102 from the bottom end side position of the linking tube 96 to the direction of the bellows portion 106 of the dustcover 92) becomes widest at the position closest to the center of pitching of the suspension arm 14 (i.e., the bushing holder 16) and becomes gradually narrower the further away it gets from the bushing holder 16. Also, a load disperser 104 that extends from the lower end portion towards the inner peripheral side is integrally formed around the entire periphery at the lower end portion of the shoulder portion 102.

The dustcover 92 is provided with the bellows portion 106 linked to the bottom side of the hanger component 94 and a fastening band 108 that links and fixes the upper end portion of this bellows portion 106 to the lower end portion of the shoulder portion 102. A cylindrical linking portion 110 is formed at the upper end portion of the bellows portion 106 and fitted onto the outer peripheral side of the shoulder portion 102. The fastening band 108 is wrapped around the outer peripheral side of the linking portion 110 and clamps on the linking portion 110, whereby the linking portion 110 is fixed to the lower end portion of the shoulder portion 102. At this time, the undersurface side of the load disperser 104 is put in a state of contact with the surface of the upper end portion of the bellows portion 106.

With the bellows portion 106, the lower part under the linking portion 110 can expand and contract along the pitching direction of the suspension arm 14. The bellows portion 106 is configured as a separate part from the hanger component 94 and is formed through blow-molding (blow-forming) with a material, e.g., polyolefin elastomer, which is a resin material relatively rich in flexibility. Note that with regard to the material for forming the bellows portion 106, as long as the material is flexible and can be blow-formed, other materials besides a polyolefin elastomer such as other resin materials and rubber compounds can also be used. The hanger component 94 is formed from a material that, when compared to the material used for forming the bellows portion 106, has a higher specific intensity, such as a metal material like an aluminum alloy or a hard resin material.

Next, the action and effects of the air spring 90 according to the present embodiment configured as described above will be explained.

By arranging the air spring 90 according to the present embodiment between the vehicle body 15 and the suspension arm 14, the air spring 90 makes a suspension reactive force corresponding to the air pressure in the chamber 44 act on the suspension arm 14, and load inputted to the suspension arm 14 from the road surface side is supported by this suspension reactive force. At this time, when the suspension arm 14 pitches, the dustcover 92 makes the bellows portion 106 extend and contract in the up and down directions in response to the pitching of this suspension arm 14.

Also, when the suspension arm 14 pitches, the dustcover 92 makes the amount of extension/contraction at one end side in the direction of diameter at the bellows portion 106 near the center of pivoting of the suspension arm 14 (bushing holder 16); and the amount of extension/contraction at the other end side in the direction of diameter far from the center of pivoting of the suspension arm 14 each differ, whereby the flange component 66 (see FIG. 1) is inclined so as to follow the inclination of the suspension arm 14. Due to this, the flange component 66 is maintained in a state where it is crimped against the upper surface portion of the suspension arm 14 even when the suspension arm 14 pitches.

With the air spring 90 according to the present embodiment, the linking tube 96 and the shoulder portion 102 in the dustcover 92 are integrally formed as the hanger component 94 and the bellows portion 106 is formed as a separate body from that of the hanger component 94. By configuring the device so that the upper end portion of the bellows portion 106 is fixed to the lower end portion of the shoulder portion 102 with the fastening band 108, the shoulder portion 102 and the bellows portion 106 are formed from different types of materials where aspects such as their respective specific intensities differ, or the thickness of the shoulder portion 102 can be arbitrarily set in accordance with the desired mechanical qualities such as rigidity, without being affected by the thickness of the bellows portion 106. Due to this, the rigidity of the shoulder portion 102 relative to the restorative force of the compression deformed bellows portion 106 can be sufficiently increased and the amount of flex deformation of the shoulder portion 102 that received the restorative force of the bellows portion 106 towards the linking tube 96 side can be sufficiently decreased.

As a result, with the air spring 90 according to the second embodiment, the rigidity of the shoulder portion 102 relative to the restorative force of the compression deformed bellows portion 106 can be sufficiently increased so flex deformation of the shoulder portion 102 by the compression deformed bellows portion 106 towards the linking tube 96 side can be effectively prevented. Accordingly, the early occurrence of cracks and the like in the shoulder portion 102 due to such deformation, and the deterioration of the lifespan of the dustcover 92, can be prevented.

With the air spring 90 according to the present embodiment, at the lower end portion of the shoulder portion 102, the load disperser 104 is formed to come into contact with the bellows portion 106 in a state of surface contact. Thereby, even when the bellows portion 106 crimps against the lower end portion vicinity of the shoulder portion 102 with a lot of load due to its restorative force, the area of the portion of contact between the bellows portion 106 and the shoulder portion 102 expands and the load is dispersed. The greatest stress that is generated at the upper end portion of the bellows portion 106 can be reduced. Accordingly, the occurrence of damage such as cracks and the like in the shoulder portion 102 due to the stress generated by the bellows portion 106 crimping against the shoulder portion 102 can be effectively prevented.

Note that with the air spring 90 according to the second embodiment, the hanger component 94 in the dustcover 92 is formed from a material where the specific intensity is higher than the bellows portion 106 (i.e., a different type of material). Nonetheless, the device can be configured so that the hanger component 94 is formed from the same material as the bellows portion 106 and the thickness of the hanger component 94 is made thicker than that of the bellows portion 106, whereby the rigidity of the shoulder portion 102 relative to the restorative force of the bellows portion 106 can be sufficiently increased.

Alternate Example of the Second Exemplary Embodiment

Figure 5:
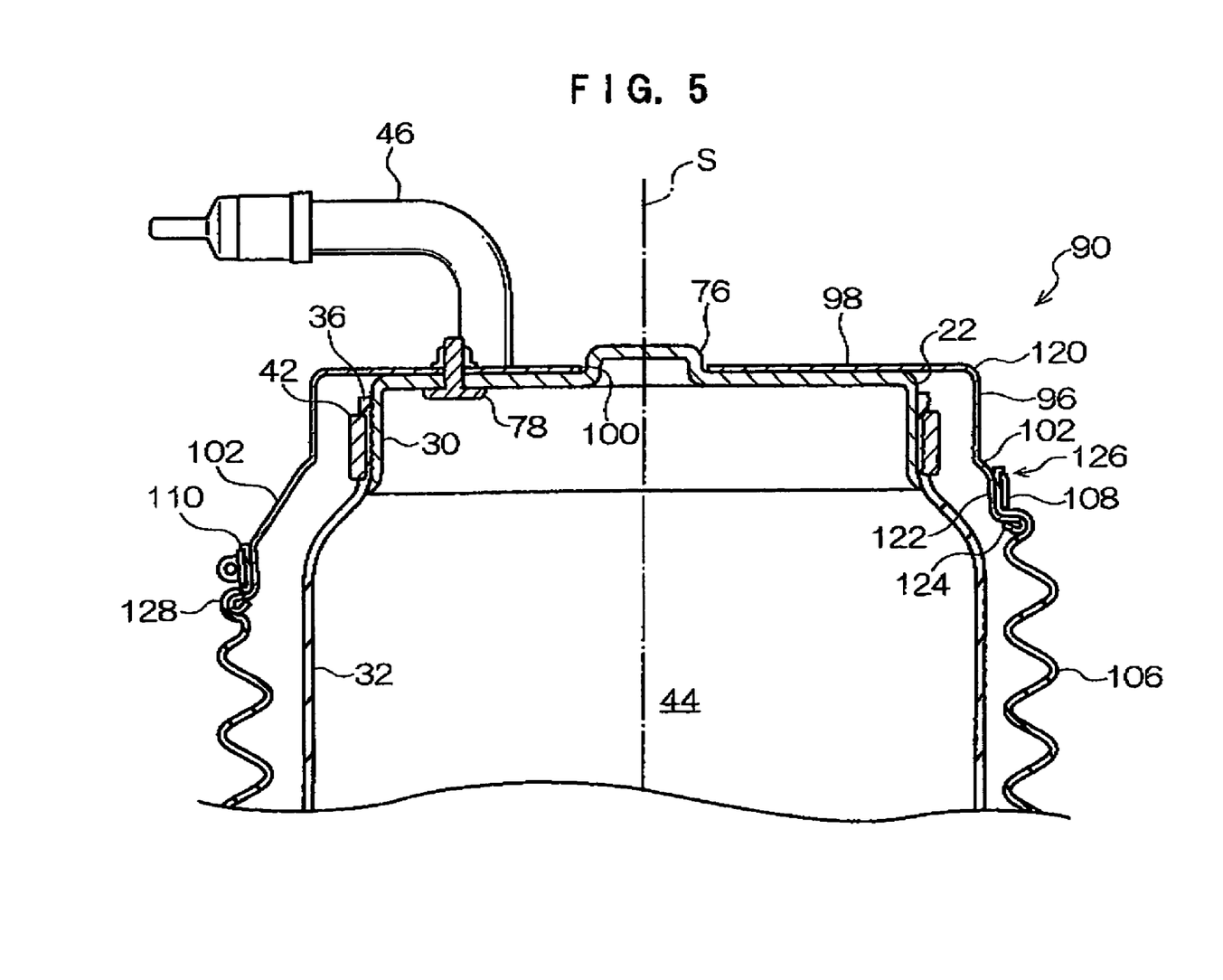
FIG. 5 is a side cross-sectional drawing showing an alternate example of a hanger component and dustcover in the air spring according to the second embodiment of the present invention.

An alternate example of the hanger component and the dustcover in the air spring 90 according to the second example is shown in FIG. 5. Note that the symbol C shows the axis center of the dustcover in a case where the suspension arm 14 is in a neutral (non-pitching) state. The following explanations will be made where the direction of this center axis C acts as the axial direction of the device.

A circular tube 122 whose outer diameter is substantially constant with the lower end side of the shoulder portion 102 is formed at the hanger component 120 shown in FIG. 5, and a flanged load disperser 124 that extends to the outer peripheral side from the lower end portion of the circular tube 122 is integrally formed therewith. The lower end portion of the circular tube 122 at the load disperser 124 curves towards the outer peripheral side across the entire periphery and the outer peripheral portion of the curved portion is formed in a tube shape that curves downward. The outer peripheral side of the load disperser 124 is a smooth curved substantially teardrop shape.

Figure 6:
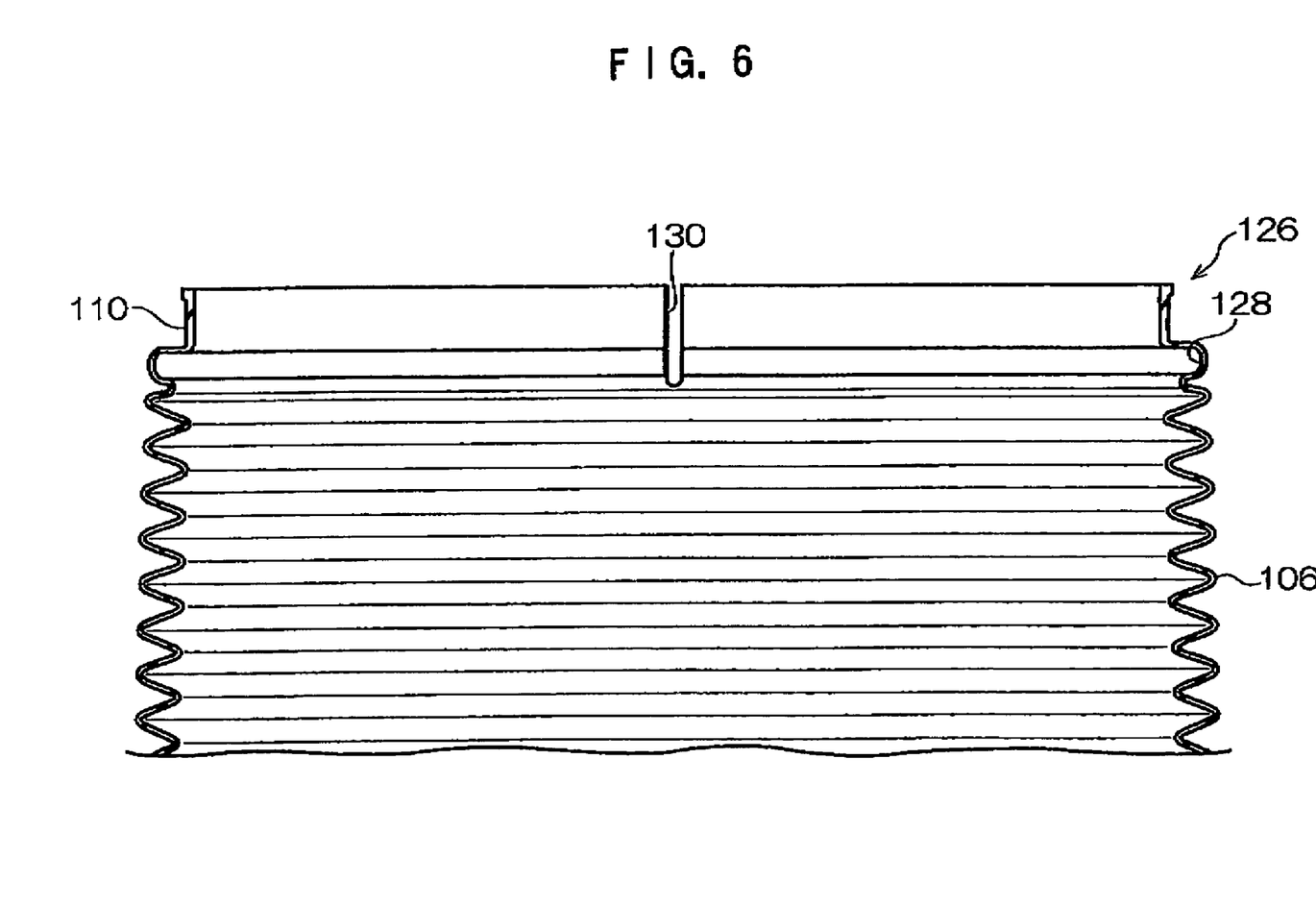
FIG. 6 is a side cross-sectional drawing showing the configuration of the dustcover shown in FIG. 5.

A fitting portion 128 that fits from the outer peripheral side onto the load disperser 124 is integrally formed at the lower end portion of the linking portion 110 with the dustcover 126 shown in FIG. 5. The fitting portion 128 is formed into a substantially U-shaped form whose cross-sectional shape is open towards the inner peripheral side. The fitting portion 128 is fit onto the load disperser 124 from the outer peripheral side, whereby its inner surface side is closely adhered in a state of surface contact respectively with the upper surface side and the lower surface side of the load disperser 124. Also, as shown in FIG. 6, a slit 130 is formed in the dustcover 126 so as to traverse from the upper end along the axial direction of the linking portion 110 and the load disperser 124. At least one or more slit 130 is provided in the dustcover 126. In order to prevent the generation of cracks at the lower end of the slit 130 that is the starting point, the lower end portion at the inner surface side is formed into a curved substantially U-shaped surface.

As shown in FIG. 5, the linking portion 110 is fit onto the outer peripheral side of the circular tube 122 of the hanger component 120, and the fitting portion 128 is fit onto the load disperser 124 of the hanger component 120 from the outer peripheral side. With the air spring 90, the fastening band 108 is wrapped around the outer peripheral side of the linking portion 110 and by tightening the linking portion 110 with this fastening band 108, the linking portion 110 becomes fixed to the circular tube 122. At this time, even in a case where the amount of restriction of the fastening band 108 was made sufficiently large, by narrowing the opening width of the slit 130 in accordance with the amount of constriction of the fastening band 108, so the occurrence of wrinkles and slackening in the circular tube 122 and fitting portion 128 at the dustcover 126 is prevented, so when the linking portion 110 is fixed to the circular tube 122 using the fastening band 108, the operational qualities thereof can be made favorable.

With the air spring 90 provided with the hanger component 120 and dustcover 126 as described above, the fitting portion 128 of the dustcover 126 is fit onto the load disperser 124 of the hanger component 120, and the linking portion 110 of the dustcover 126 is tightened and fixed to the circular tube 122 of the hanger component 120 with the fastening band 108, whereby, when compared to the air spring 90 provided with the hanger component 94 and dustcover 92 shown in FIG. 4, the linking strength between the dustcover 126 and the hanger component 120 can be greatly increased. As a result, when, for example, the vehicle is traveling on bad roads, dropping out of the linking portion 110 from the circular tube 122 can be prevented, even when excessive extending occurs in the bellows portion 106 of the dustcover 126.

What is claimed is:

1. An air spring comprising:
a chamber component linked to one of a support body and a movable body;
a piston component linked to the other of the support body and the movable body;
a diaphragm formed in a substantially cylindrical shape and set in a state in which the inside and outside thereof at a middle portion are reversed, one end portion and another end portion are linked, respectively, to the chamber component or the piston component, and a chamber is formed at the interior of the diaphragm;
a dustcover that is arranged at an outer peripheral side of the diaphragm and that is provided with a linking tube fixed to an outer peripheral side of the chamber component at an upper end thereof, the dustcover being integrally provided with a shoulder portion that extends from a lower end portion of the linking tube to an outer peripheral side and a tubular bellows portion that extends downward from a lower end portion of the shoulder portion and is extendable and retractable along a direction of movement of the movable body; and
a deformation-preventing component that is arranged at an outer peripheral side of the shoulder portion and that comes into contact with the shoulder portion when the bellows portion is compression deformed, and restricts elastic deformation of the shoulder portion towards the linking tube side,
wherein the deformation-preventing component is provided with a linking portion fixed to the chamber component at an upper end portion of the deformation-preventing component, and is provided with a stopper that extends from a lower end portion of the linking portion towards the outer peripheral side of the shoulder portion and faces the shoulder portion.

2. The air spring of claim 1, wherein the stopper is provided so as to encircle the shoulder portion around the entire periphery from the outer peripheral side.

3. The air spring of claim 1, wherein the stopper is provided so as to face a portion along the peripheral direction at the shoulder portion from the outer peripheral side.

4. The air spring of claim 1, wherein a load disperser is formed at the stopper and extends from the lower end portion thereof to the outer peripheral side.

5. The air spring of claim 4, wherein the load disperser is formed in order to expand the area of contact between the stopper and the shoulder portion at the time of compression-deformation of the bellows portion.

6. An air spring comprising:
a chamber component linked to one of a support body and a movable body;
a piston component linked to the other of the support body and the movable body;
a diaphragm formed in a substantially cylindrical shape and set in a state in which the inside and outside thereof at a middle portion are reversed, one end portion and the other end portion are linked, respectively, to the chamber component or the piston component, and a chamber is formed at the interior of the diaphragm;
a dustcover that is arranged at an outer peripheral side of the diaphragm and that is provided with a linking tube fixed to an outer peripheral side of the chamber component at an upper end thereof, the dustcover also being provided with a shoulder portion that extends from a lower end portion of the linking tube to an outer peripheral side and
a tubular bellows portion that extends downward from a lower end portion of the shoulder portion and is extendable and retractable along a direction of movement of the movable body,
wherein the linking tube and the shoulder portion are integrally formed and the bellows portion is formed separately from the linking tube and the shoulder portion, and the dustcover is configured to link an upper end portion of the bellows portion to the lower end portion of the shoulder portion,
wherein a load disperser is formed at the lower end portion of the shoulder portion so as to extend towards an inner peripheral side in order to expand the area of contact between the shoulder portion and the bellows portion.

7. The air spring of claim 6, wherein the bellows portion is formed from an elastic material and the linking tube and the shoulder portion are formed from a material having a specific intensity greater than that of the bellows portion.

8. The air spring of claim 6, wherein a tubular linking portion that is fit onto an outer peripheral side of the lower end portion of the shoulder portion is formed at the upper end portion of the bellows portion, and the air spring further comprises a band component provided at the dustcover that is wound around from an outer peripheral portion of the linking portion and that tightens and fixes the linking portion to the lower end portion of the shoulder portion.

9. An air spring comprising:
a chamber component linked to one of a support body and a movable body;
a piston component linked to the other of the support body and the movable body;
a diaphragm formed in a substantially cylindrical shape and set in a state in which the inside and outside thereof at a middle portion are reversed, one end portion and the other end portion are linked, respectively, to the chamber component or the piston component, and a chamber is formed at the interior of the diaphragm;
a dustcover that is arranged at an outer peripheral side of the diaphragm and which is provided with a linking tube fixed to an outer peripheral side of the chamber component at an upper end thereof; is provided with a shoulder portion that extends towards an outer peripheral side from a lower end portion of the linking tube, and a circular tube that extends from a lower end side of the shoulder portion, and is further provided with a tubular bellows portion that extends downward from a lower end portion of the circular tube and can expand and contract along a direction of movement of the movable body, wherein the linking tube, the shoulder portion, and the circular tube are integrally formed, the bellows portion is formed separately from the linking tube, the shoulder portion, and the circular tube, and the dustcover is configured to link an upper end portion of the bellows portion to the circular tube, wherein a load disperser that extends towards the outer peripheral side is formed at the lower end portion of the circular tube.

10. The air spring of claim 9, wherein the bellows portion is formed from an elastic material and the linking tube, the shoulder portion, and the circular tube are formed from a material having a specific intensity greater than that of the bellows portion.

11. The air spring of claim 9, wherein a tubular linking portion that is fit onto an outer peripheral side of the circular tube is formed at the upper end portion of the bellows portion, and the air spring further comprises a band component provided at the dustcover that is wound around from an outer peripheral side of the linking portion, and that tightens and fixes the linking portion to the circular tube.

12. The air spring of claim 9, wherein an outer peripheral side of the load disperser is curved downward.

13. The air spring of claim 12, wherein a fitting portion that fits onto the load disperser from the outer peripheral side is formed at the bellows portion.

14. The air spring of claim 9, wherein a slit is formed at the bellows portion from an upper end thereof in an axial direction at a position corresponding to the linking portion and the load disperser in an assembled state.

* * * * *